March 19, 1968     R. E. REICHARD     3,373,661
BRAKE PEDAL POSITIONING DEVICE
Filed Sept. 1, 1965
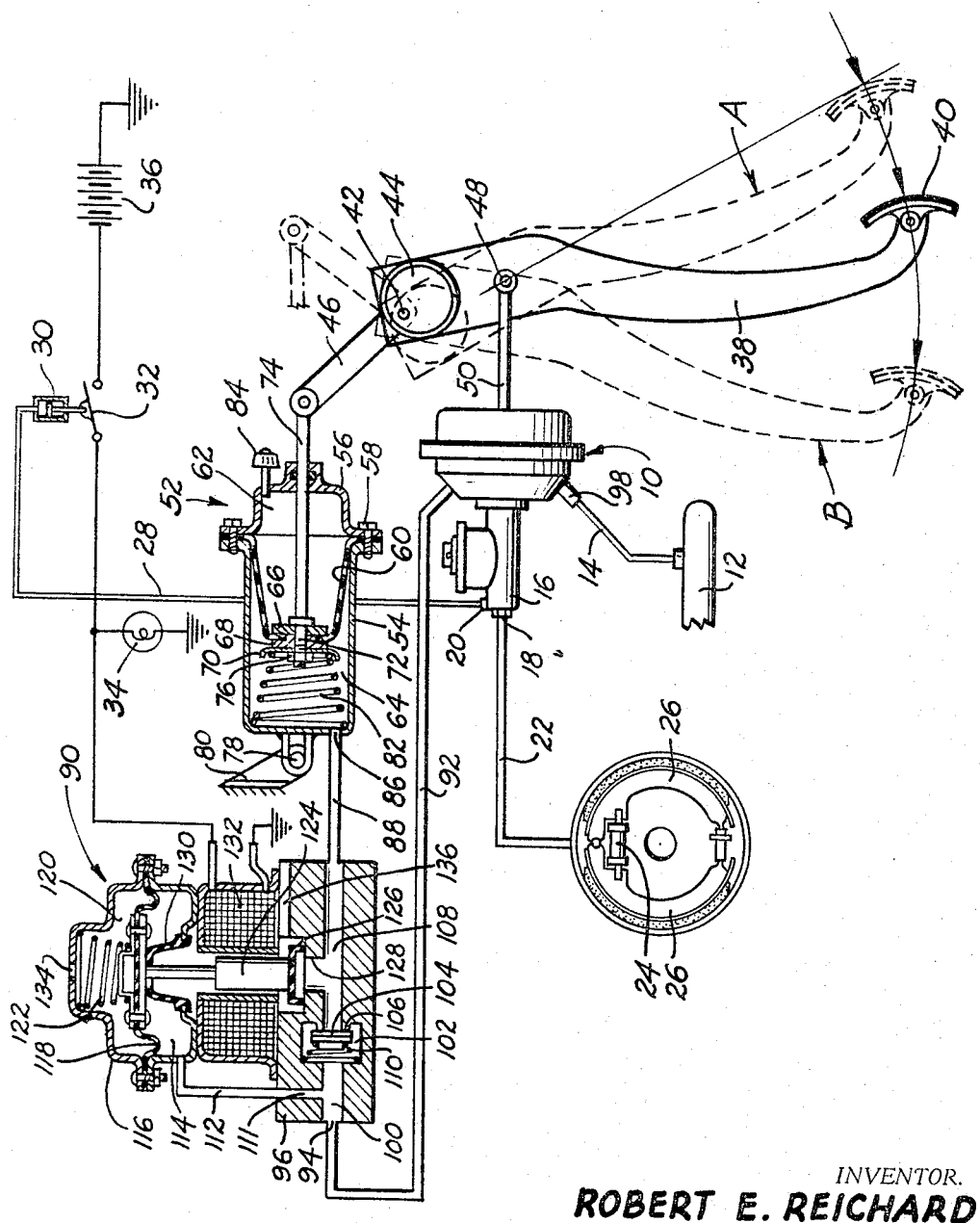
INVENTOR.
ROBERT E. REICHARD.
BY
ATTORNEY.

United States Patent Office 3,373,661
Patented Mar. 19, 1968

3,373,661
BRAKE PEDAL POSITIONING DEVICE
Robert E. Reichard, 401 N. Bendix Drive,
South Bend, Ind. 46628
Filed Sept. 1, 1965, Ser. No. 484,230
7 Claims. (Cl. 91—391)

This invention relates to power brakes for automotive vehicles and in particular to a means to position a brake pedal operating same between a low position and a high position.

Short pedal travel is very important to manufacturers of motor vehicles, since less leg room in the driver's compartment becomes necessary and the brakes may be applied with ease simply by pivoting the foot about the heel between the accelerator and the brake pedal or treadle. There are times, however, when due to lack of sufficient booster pressure or power or other causes, full manual operation becomes necessary, as for example when starting the engine of a car while the latter is standing on a hill or slope without bothering to use the emergency brake, assuming the latter is serviceable, or in a case of power failure. At such times the driver or operator of the vehicle should be able to set the brakes by the same pedal, treadle or other manual member without necessitating any attention on the driver or operator's part other than to exert the additional force required for full manual braking, and such is an important object of the instant invention.

It should be realized that conventional power brake booster units of the type familiar to those skilled in the art utilize a pressure differential across a wall thereof to augment the manual effort of an operator on a brake pedal which is provided with a low pedal ratio and a reduced stroke for the purposes aforementioned. The brakes also can be applied by direct manual effort, as mentioned above, in the event of a power failure, but greatly increased manual effort is required in power brake constructions as compared with conventional brakes due to the lower pedal ratio and shorter pedal stroke. It has been proposed to employ an auxiliary means to move the brake pedal to a raised or full stroke position such as has been proposed in the Patent No. 2,858,911, assigned to the common assignee of this application, and also in the U.S. Patent No. 2,844,228, issued July 22, 1958. One thing that is rather apparent, and as was mentioned in the last mentioned patent above, is the necessity for maintaining the low pedal position during the failure of power or during other conditions until the operator of the associated vehicle has started to apply the brakes. This is necessitated in order to prevent the wasting of reaction time while the operator attempts to locate the brake pedal after having pivoted his foot from the accelerator pedal. Therefore it is another object of this invention to provide a means for maintaining the low pedal position until the brake pedal has been actuated during conditions which necessitate the increased height of the brake pedal for manual braking operation.

Other and further objects may appear to those skilled in the art to which my invention relates from the following description of the drawing showing a cross sectional view of the valving and fluid pressure motor utilized in raising and lowering a brake pedal in accordance with the principles of my invention as embodied in a schematic power brake system for a vehicle.

With more particular reference to the drawing, the braking system consists of a vacuum operated power brake unit 10 to which is supplied vacuum from an engine intake manifold 12, as by a conduit 14. The power brake unit is provided with a master cylinder 16 that supplies fluid pressure to outlets 18 and 20. As seen, the outlet 18 is connected by means of a conduit 22 to a wheel cylinder 24 of the wheel brakes 26 for an associated vehicle, only one of which is shown. The outlet 20 is connected by means of a conduit 28 to a pressure responsive motor 30 that actuates a stoplight switch 32 to provide an indication to the followers of the actuation of the brakes The stoplight being schematically shown as at 34 and receiving an electrical impulse due to the closing of the stoplight switch 32 to connect a vehicle battery 36 therewith.

The power brake unit is actuated by a brake operating lever 38 having attached thereto a brake pedal 40 and being pivoted to vehicle structure by means of a pin 42. The pin 42 has an eccentrically enlarged portion 44 that is received by the brake operating lever 38. Furthermore, the pin 42 is fixed to a link 46 for purposes as will hereinafter appear. A lever 38 is also provided with a pivotal connection as at 48 to a push rod 50 controlling the power brake unit 10. For purposes of description of the power brake unit reference may be had to the U.S. Patent No. 3,143,929, issued Aug. 11, 1964, to the common assignee. Herein it may be essentially described as a unit that under normal power condition requires that the valve be operated (without follow-through) for normal brake operation and yet allows follow-through for no power (manual) operation.

It is to be realized that with such a power brake unit there is required to be a large manual pedal travel to obtain a hydraulic displacement necessary for the braking system during no power conditions. This large manual pedal travel requires a high brake pedal in the released position, a lowered pedal position for power (or normal) operation is also desirable. I have obtained this desirable feature by providing a high-low pedal for the use of the eccentric portion 44 due to the rotation thereof about the pin 42 by means of the link 46 which will move the brake operating lever forming a portion of the brake applying means to raise the pedal from the normal low position shown in solid line to the high position to the right of the solid lines, as generally indicated by the reference character A. It thus may be realized that the brake pedal 40 and the operating lever 38 may be moved from the full actuated position, as shown by the reference character B from either the normal low position shown in the solid lines of the drawings or the high position "A."

In order to move the link 46 rotating the pin 42 and the eccentric portion 44, I have provided a novel arrangement of a fluid pressure motor and control valve therefor as follows:

The fluid pressure motor 52 consists of a two part housing 54 and 56 joined together by bolts 58 and clamping a peripheral edge of a diaphragm 60 at the juncture thereof to sealingly provide variable volume chambers 62 and 64 within the motor. Centrally the diaphragm is clamped by means of mating rings 66 and 68 and a spring bearing plate 70 that are held together by means of a threaded extension 72 of a force transmitting rod 74 and a nut 76 bearing upon the spring bearing plate 70. The motor 52 is held by means of a pivotal connection 78 to an arm 80 that is affixed to vehicle structure. Between the spring bearing plate 70 and the housing portion 54, I have provided a biasing spring 82 for positioning the diaphragm 60 and force transmitting rod 74 in the absence of a pressure differential across the diaphragm 60.

In order to create a pressure differential, as above mentioned, across the diaphragm I have provided an air inlet filter 84 providing atmospheric air to the variable volume chamber 62 and a vacuum inlet port 86 connected to a conduit 88 receiving a vacuum source as will be described below. So long as there is a vacuum in the chamber 64 and atmosphere in chamber 62, the diaphragm 60 will be positioned as shown in the drawing compressing the spring 82.

Vacuum is supplied to the motor or pedal positioning cylinder, as it may be termed, by a control or pedal positioning valve 90. This is essentially a solenoid valve with a vacuum cylinder override. Vacuum is supplied to the valve by means of a conduit 92 from the power braking unit 10 to an inlet port 94 in a lower valve housing 96. It should be noted that this vacuum supply from the power brake unit is from the check side of the power brake unit reservoir in that a check valve 98 is provided on the power brake unit 10 between the conduit 14 and the unit. The vacuum flows through the lower housing 96 by means of an inlet chamber 100 leading to a check valve chamber 102 containing a plug type check valve 104 biased against a valve seat 106 of a discharge passageway 108 due to a conical spring 110. It may thus be realized that so long as vacuum is within the conduit 92, the plug type check valve 104 will be pulled off the seat 106 to communicate vacuum from inlet chamber 100 to discharge passageway 108 and thus to the conduit 88 leading to the port 86 of the fluid pressure motor 52. In addition, the inlet chamber 100 is provided with a radial passageway 111 to which a conduit 112 in the embodiment shown in the drawing is connected to communicate the pressure within the chamber 100 to a variable volume chamber 114 in the upper valve housing 116. In the variable volume chamber 114 a rolling type diaphragm 118 is sealingly affixed to the upper housing 116 to separate a further variable volume chamber 120 above the diaphragm 118 from the lower variable volume chamber 114. The diaphragm 118 is also connected to a pair of plates centrally thereof which on one side receive a spring 122 and on the other side mount a plunger valve 124 having on its extreme end opposite that connected to the diaphragm a valve seat 126 that in the normal position closes a radial passage 128 leading to the discharge passageway 108 in the lower valve housing 96. Beneath the variable volume chamber 114 and sealed therefrom by means of a diaphragm type seal 130, I have provided an electrical solenoid coil 132 which is energized by means of an electrical signal from the battery whenever the stoplight switch 32 is closed due to the pressure responsive motor 30 being actuated by the master cylinder 16. As shown in the drawing, the appropriate electrical circuitry is schematically illustrated.

In operation, the solenoid valve 90 is energized each time the stoplight switch 32 closes. The solenoid valve cannot actuate however as long as vacuum is supplied by means of conduit 112 to the variable volume chamber 114 in that the variable volume chamber 120 is open to atmosphere, as at 134 to force the plunger valve 124 to engage its seat 126 with the peripheral portions of the radial passage 128. However, in the absence of a vacuum pressure in the variable volume chamber 114, the closing of the stoplight switch will actuate the solenoid valve to raise the plunger valve 124 in a manner well known in the art and lift the valve seat 126 to communicate an atmospheric passage 136 to the radial passage 128 and the discharge passageway 108 into the variable volume chamber 64 to suspend the diaphragm 60 in atmospheric pressure. At this point the spring 82 takes over to force the force transmitting rod 74 outwardly to pivot the link 46 and rotate the eccentric portion 44 of the pin 42 to raise the pedal from the low position shown to the high position as generally indicated by the reference character "A."

During normal operation, the pedal positioning cylinder 52 is evacuated to the high engine vacuum level and held there by the pedal positioning check valve 104. In addition, the vacuum cylinder override, and more particularly, the variable volume chamber 114, is also evacuated and energization of the solenoid will not open the pedal positioning cylinder to atmosphere. Thus, the eccentric operating lever or link 46 is pulled to the left and the brake pedal is lowered to the popped-down position.

Loss of vacuum in the power brake reservoir removes the force of the vacuum cylinder override by removing the vacuum from the variable volume chamber 114. Therefore, when the first brake application after loosing vacuum is made, the solenoid 132 is energized and actuates in absence of the vacuum cylinder override allowing the plunger valve to vent the fluid pressure motor 52 to atmosphere. Thereupon the eccentric operating lever moves to the right, as seen by the dashed lines in the drawing, and the brake pedal rises to the high or popped-up position. Restoration of vacuum automatically lowers the pedal to its popped-down or low position as mentioned above.

As other means of accomplishing the intent of my invention may be accomplished by varying certain of the elements herein, I do not wish to be limited by the embodiment above described. It is my intent to be limited solely in this application to the scope of the appended claims.

I claim:

1. In combination with a hydraulic brake system for a motor vehicle including a vacuum operated power brake device having a vacuum source connected thereto for normally developing braking pressures in said hydraulic brake system:
   a brake applying means including a lever pivotally connected to said power brake device and carrying a rotatable pin spaced from said pivotal connection;
   a fluid pressure motor operatively connected to said vacuum operated power brake devices such that the vacuum source communicated to said power brake device creates a pressure differential across a wall in said motor;
   a link means operatively connected to said fluid pressure motor and to said rotatable pin such that said motor controls the rotation of said pin to raise and lower said brake applying means in the motor vehicle; and
   means controlling the communication between said power brake device and said fluid pressure motor, which means reference the braking pressures and the vacuum source to raise said brake applying means upon failure of said vacuum source.

2. A brake applying means according to claim 1 wherein said rotatable pin is provided with an eccentrically located point of attachment with said link means.

3. A brake applying means according to claim 1 wherein said means controlling the communication between said power brake device and said motor comprises:
   a valve housing having a first inlet port and a second inlet port and a discharge port with said first inlet port in operative connection with said power brake device and said discharge port in operative connection with said fluid pressure motor;
   a plunger valve controlling communication of said second inlet port and said discharge port;
   a pressure responsive movable wall operatively connected to said plunger valve and arranged to receive fluid pressure from said first inlet on one side thereof and fluid pressure equivalent to that in said second inlet on the other side thereof;
   a check valve in a fluid passageway communicating said first inlet and said discharge port; and
   an electrical solenoid operatively connected to said power brake device to be actuated by braking pressures developed thereby to oppose said pressure responsive wall to operate said plunger valve whenever the pressure differential across said wall is destroyed to open said second inlet port to said discharge port whereupon said fluid pressure motor will rotate said pin to raise said brake applying means.

4. A brake applying means comprising:
   a brake pedal;
   a rotatable pin securing said brake pedal to fixed structure, said rotatable pin having an axis of rotation for revolvably mounting said pin to said fixed structure eccentrically located with respect to the axis of the mounting of said brake pedal therewith; and a fluid pressure motor operatively connected to said pin on the axis mounting said pin to said structure for raising and lowering said brake pedal.

5. A brake applying means according to claim 4 including a control valve for rendering said fluid pressure inoperative to raise said brake pedal until said brake pedal has been actuated to prevent groping for said pedal.

6. A brake applying means according to claim 5 wherein said control valve includes a check valve to hold a biasing force on said motor until the brakes are actuated.

7. A brake applying means according to claim 4 wherein said fluid pressure motor is normally held inoperative by a valve means controlled by a biasing action of a pressure responsive means and an electrical solenoid means.

References Cited

UNITED STATES PATENTS

| 3,250,183 | 5/1966 | Gephart | 91—391 |
| 3,250,184 | 5/1966 | De Hoff | 91—391 |

FOREIGN PATENTS

| 132,035 | 2/1947 | Great Britain. |

MARTIN P. SCHWADRON, *Primary Examiner.*

P. E. MASLOUSKY, *Assistant Examiner.*